United States Patent
Ramaswamy et al.

(10) Patent No.: US 6,563,787 B1
(45) Date of Patent: May 13, 2003

(54) METHOD AND APPARATUS FOR PROVIDING DATA FLOW CONTROL OF A TRANSMISSION PORT

(75) Inventors: Srinivasan Ramaswamy, Nepean (CA); Thomas Edward Davis, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/295,821

(22) Filed: Apr. 21, 1999

Related U.S. Application Data

(63) Continuation-in-part of application No. 09/188,874, filed on Nov. 9, 1998.

(51) Int. Cl.[7] .............................................. G01R 31/08
(52) U.S. Cl. ....................................................... 370/229
(58) Field of Search ................................. 370/229, 236, 370/220, 230–235; 345/521, 564, 505; 341/63–67

(56) References Cited

U.S. PATENT DOCUMENTS

| | | | | |
|---|---|---|---|---|
| 5,363,097 A | * | 11/1994 | Jan | 341/67 |
| 6,049,526 A | * | 4/2000 | Radhakrishman et al. | 370/220 |
| 6,069,872 A | * | 5/2000 | Bonomi et al. | 370/236 |
| 6,252,847 B1 | * | 6/2001 | Lee | 370/229 |
| 6,262,749 B1 | * | 7/2001 | Finger et al. | 345/521 |
| 6,370,114 B1 | * | 4/2002 | Gullicksen et al. | 370/229 |

* cited by examiner

*Primary Examiner*—Kwang Bin Yao
*Assistant Examiner*—Prenell Jones

(57) ABSTRACT

A method and apparatus for data flow control of a transmission port includes processing that begins by obtaining, for the transmission port over time, input data rate of at least one data transport type and output data rate of the at least one data transport type. The data type transport type is one of available bit rate (ABR), variable bit rate (VBR), constant bit rate (CBR), and unspecified bit rate (UBR). The data flow control continues by deriving a difference term from the input data rate and the output data rate and using the difference term and a previous generic explicit rate to generate a current generic explicit rate. The current generic explicit rate may further be generated from the previous generic explicit rate, the difference term, and an error term, where the error term is derived from a current queue value and a target queue value. Having generated the current generic explicit rate, at least one specific explicit rate for a corresponding one of a plurality of connections of the at least one data transport type is determined from the current generic explicit rate and a corresponding weighting factor.

20 Claims, 2 Drawing Sheets

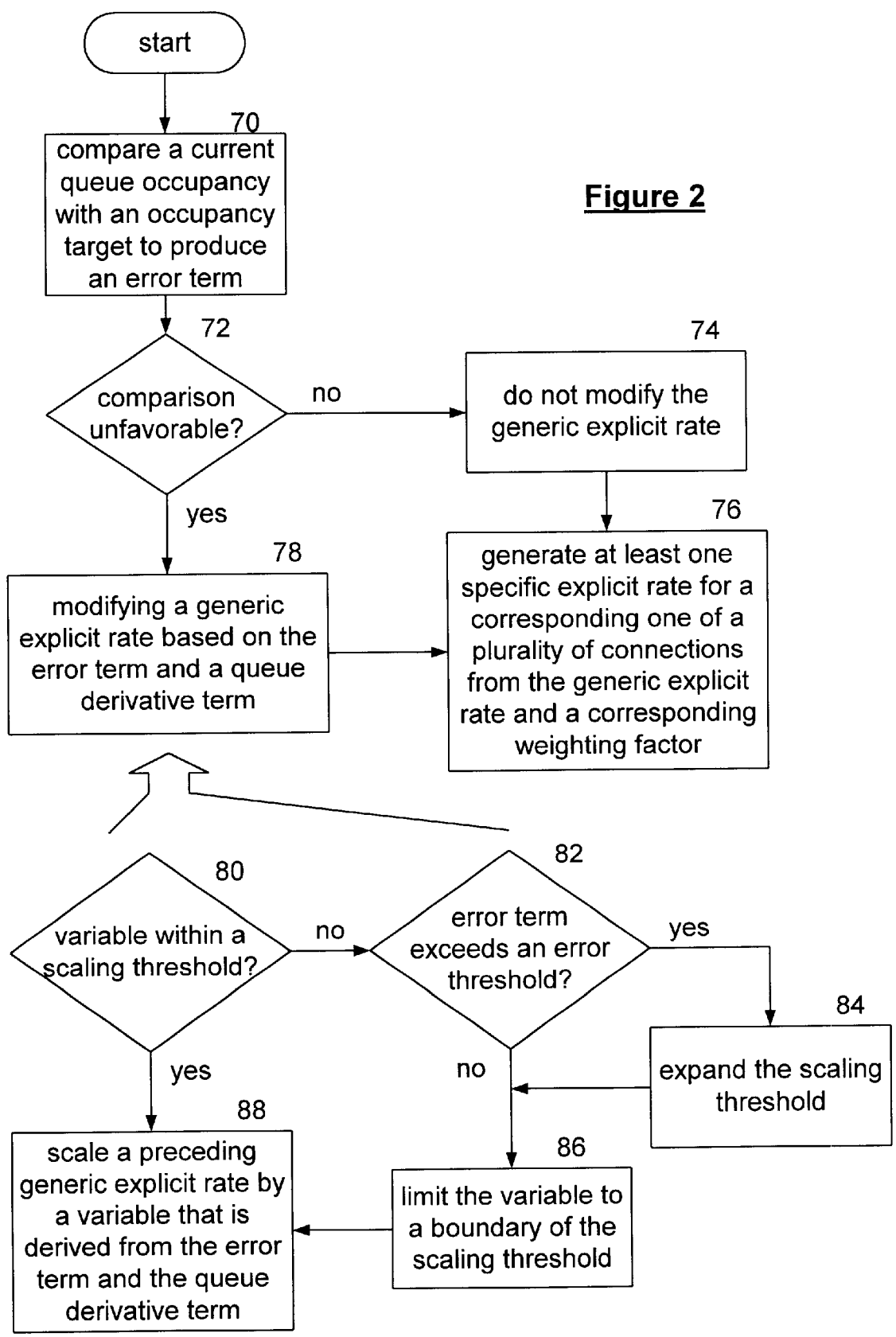

METHOD AND APPARATUS FOR PROVIDING DATA FLOW CONTROL OF A TRANSMISSION PORT

This patent application is a continuation-in-part of co-pending patent application entitled "METHOD AND APPARATUS FOR FLOW CONTROL OF A TRANSMISSION PORT" having a Ser. No. of 09/188,874, and a filing date of Nov. 9, 1998.

TECHNICAL FIELD OF THE INVENTION

The present invention relates generally to traffic management and more particularly to a method and apparatus for data flow control of a transmission port in a communications network.

BACKGROUND OF THE INVENTION

Communications networks are comprised of many components including telecommunications switches that route voice and/or data packets to and from various devices (i.e. sources and destinations) that are connected to the network. These devices include telephones, facsimile machines, routers, servers, and/or other switches. The telecommunications switches perform many complex functions to manage data traffic. For example, the switch increases its available bandwidth while reducing the complexity of the network. As such, the Qualities of Service (QoS) of the switches improves.

An ATM network, which is an example of a communications network, has a number of available QoS classes including: constant bit rate (CBR), real-time variable bit rate (VBR), non-real-time variable bit rate (VBR), and unspecified bit rate (UBR). CBR and VBR are typically dedicated for handling real-time communication such as voice and video while UBR is typically dedicated for handling data communication. ATM switches, in an ATM network, use traffic load information to calculate the allowed data rates that can pass through them. In general, these data rates are sent to various devices connected to the network through resource management (RM) cells. RM cells include forward resource management (FRM) cells and backward resource management (BRM) cells.

In a point-to-point communication, a source sends an FRM cell every 32 cell transmissions. The FRM cell indicates, for the given data transmission, the rate at which the source is transmitting data (e.g. 10 Mbps). The FRM cells propagate through the network until they are received by a destination. The destination processes each FRM cell and produces, therefrom, a BRM cell, which indicates that the current data rate of the source is acceptable, too slow, or too fast. Such an indication may be done by a congestion indication (CI) bit and a no increase (NI) bit, and/or an explicit rate (ER) value. For example, the destination sets the CI bit when the source data rate is too fast, sets the NI bit and clears the CI bit) when the source data rate is acceptable, and clears both the CI and NM bits when the source data rate is too slow. Alternatively, the destination may calculate an ER value to indicate a data rate that is acceptable to the destination. Note that a source may be an end user device (e.g., a telephone, personal computer, facsimile machine, etc.) or a virtual source (i.e., a switch that functions, with respect to a destination, as a source). Further note that a destination may be an end user device or a virtual destination (i.e., a switch that functions, with respect to a source, as a destination).

The BRM cell propagates through the network until it is received by a source. The source processes the BRM cell to adjust its data rate accordingly. For example, the source incrementally adjusts it data rate based on the CI and NI bits or it adjusts it data rate to that indicated by the ER value. This process continues for the communication, such that for each BRM cell received, the source, if needed, adjusts its data rate.

An explicit rate (ER) computational engine executes an ER algorithm to determine the ER value. In general, the ER algorithm attempts to fairly distribute bandwidth between ABR connections at a contention point (i.e., within a switch) and further attempts to prevent the ABR connections from consuming the entire bandwidth when lower priority connections are present. One such ER calculation technique measures the input bandwidth and output bandwidth of the destination, adjusts one rate over the other based on available bandwidth, and then sets the ER accordingly (i.e. increases or decreases the input of data from the source). Further, the bandwidth that is used by the CBR and VBR, can be subtracted from the total bandwidth used to produce an ABR result. This type of processing, however, is difficult to perform in real time in a switch because measuring the input rate of data is difficult and scheduling at the output port is complex. Since the input bandwidth replicates a complex scheduler, the ABR calculation will begin to grow as the scheduler becomes more complex.

Queue depth algorithms simplify the input bandwidth measurement by performing a calculation to determine if the input rate is too high or too low. If the queue is growing, the ER is decreased and if the queue is shrinking, the ER is increased. After calculating a preliminary ER, the ER value is scaled (increased or decreased) based on the source priority for each source. The scaled ER is then sent to each source where a generic explicit rate or offered bandwidth (OBW) is calculated. This is the transmission rate for each source and will change based on the next received scaled ER. One algorithm that utilizes a scaling factor to calculate the OBW is called a congestion bias algorithm. According to the congestion bias algorithm (OBW=OBW (1+/−k)). If the queue depth is not at its lower or upper threshold, the OBW can be scaled by increasing or decreasing the constant k. The scaling of the constant helps to omit a linear correction from occurring. The problem with this scaling, however, is that the scaling factor is fixed and small. Thus, when the queue depth is substantially off target, a linear correction takes time to provide the needed correction. Another problem can occur if a large number of channels are being utilized (e.g. 20,000) when the constant is increased or decreased. In this situation, the cell rate would be increased or decreased by the constant multiplied by the number of channels causing an oscillatory condition in the bandwidth. This oscillatory condition is caused because of the increased round trip time (time from a source to a destination and back to the source again) for an RM cell. A marginally stable feedback loop is formed that could become unstable.

Therefore, a need exists for a method and apparatus for flow control of a transmission port that increases the efficiency of the network by providing an efficient, real time, ER calculation in a switch that substantially minimizes or eliminates the problems discussed above.

BRIEF DESCRIPTION OF THE DRAWINGS

FIG. 2 illustrates a logic diagram of a method for flow control of a transmission port in accordance with the present invention.

DETAILED DESCRIPTION OF A PREFERRED EMBODIMENT

Figure 1:
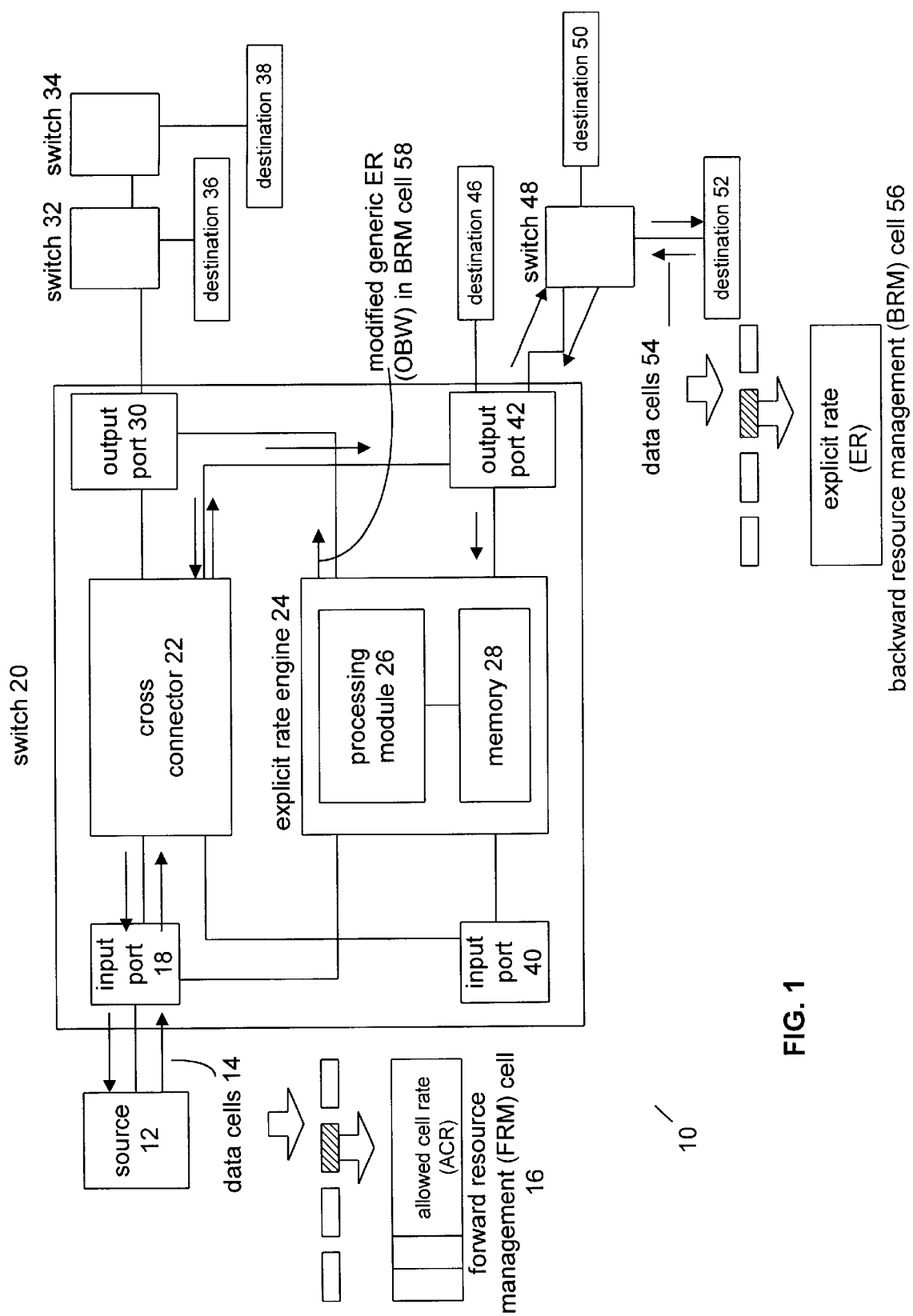
FIG. 1 illustrates a schematic block diagram of an ATM network in accordance with the present invention.

Generally, the present invention provides a method and apparatus for data flow control of a transmission port. A transmission port, which can hold a line card (T1 or DS1), can support thousands of communications per second. The data flow control begins by obtaining, for the transmission port over time, input data rate of at least one data transport type and output data rate of the at least one data transport type. The at least one data type transport type is one of available bit rate (ABR), variable bit rate (VBR), constant bit rate (CBR), and unspecified bit rate (UBR). The data flow control continues by deriving a difference term from the input data rate and the output data rate and using the difference term and a previous generic explicit rate to generate a current generic explicit rate. The current generic explicit rate may further be generated from the previous generic explicit rate, the difference term, and an error term, where the error term is derived from a current queue value and a target queue value. Having generated the current generic explicit rate, at least one specific explicit rate for a corresponding one of a plurality of connections of the at least one data transport type is determined from the current generic explicit rate and a corresponding weighting factor. With such a method and apparatus, an ER value is calculated using non-linear variables, thereby allowing the ER value to be corrected more quickly even when information pertaining to the queue is unknown.

The present invention can be more fully described with reference to FIGS. 1–2. FIG. 1 illustrates a schematic block diagram of a communications network 10 that includes a source 12, switches 20, 32, 34, and 48, and destinations 36, 38, 46, 50, and 52. The communications network 10 may be an ATM network, IP network, frame relay network, and/or any network that transports voice and/or data between sources and destinations. Switch 20, which is representative of switches 32, 34, and 48, includes input ports 18 and 40, output ports 30 and 42, a cross connector 22, and a resource management engine 24. The resource management engine 24 includes a processing module 26 and memory 28. The processing module 26 may be a single processing entity or a plurality of processing entities. Such a processing entity may be a microprocessor, microcomputer, microcontroller, digital signal processor, central processing unit, state machine, and/or any device that manipulates data based on operating and/or programming instructions. The memory 28 may be a single memory device or a plurality of memory devices. Such a memory device may be system memory, local memory, random access memory, read only memory, hard disk memory, magnetic tape memory, and/or any device that stores data. Note that if the processing module 26 implements one or more of its functions via a state machine or logic circuitry, the memory 28 storing the corresponding operational instructions is embedded in the circuitry comprising the state machine or logic circuitry. The operational instructions stored in memory 28 and executed by processing module 26 will be discussed in greater detail with reference to FIG. 2.

In a point-to-point transmission, the source 12 sends data cells 14 to a destinations 36, 38, 46, 50, or 52, where, every so often, one of the data cells 14 is a forward resource management (FRM) cell 16. As an illustrative example, the operation between source 12, switch 20, switch 48 and destination 52 will be described. As one of average skill in the art would appreciate, switches 32 and 34, and destinations 36, 38, 46, and 50 operate in a similar manner to the following example. The FRM cell 16 contains an allowed cell rate (ACR) value that indicates the data rate of the source 12. The data cells 14, including the FRM cell 16, are received by input port 18 and sent to the output port 42 through the cross connector 22. The cross connector 22 provides a linking of the input port 18 and the output port 42 based on addresses of the source and destination. The data cells 14 are then sent from output port 42 to destination 52 through switch 48. After receiving the data cells 14 (which include the FRM cells), the destination 52 responds to the source 12 with its own data cells 54. The data cells 54, which include a backward resource management (BRM) cell 56, are sent to the source via the traverse of the above described path and are also received by the resource management engine 24.

The resource management engine 24 is operable to receive the BRM cells from each of the destinations. As the resource management engine 24 receives the BRM cells, it processes them to produce a specific ER value 58 for each connection (i.e., the communication path between a source and a destination). The specific ER values 58 are determined based on the generic ER equation of $OWB_k = OWB_{k-1} * \varsigma$, where $\varsigma = 1 + k\Delta Q$ where:

$OWB_k$ represents a current offered bandwidth (i.e., the current generic explicit rate);

$OWB_{k-1}$ represents a preceding offered bandwidth (i.e., a previous generic explicit rate);

$\varsigma$ represents the OBW correctional variable;

$\Delta Q$ represents a difference term derived from an input data rate and an output data rate of a transmission port (e.g., port 18, 30, 40, 42); and k represents a constant.

The specific ER values 58 are calculated for each connection supported by the switch in accordance with the equation: specific ER value=(generic ER value/# of connections)*weighting factor. The weighting factor prioritizes the connections based on system rules, user options, system administration selections, etc. The ER value calculation as performed by the explicit rate engine will be discussed in greater detail with reference to FIG. 2.

FIG. 2 illustrates a logic diagram of a method for providing data flow control information of a transmission port. The process begins at step 70 where an input data rate of at least one data transport type and output data rate of the at least one data transport type is obtained for a transmission port over time. The output data rate may be calculated based on transmission port allocation of a plurality of data transport types, wherein the plurality of data transport types includes the at least one data transport type. For example, when the plurality of data transport types includes available bit rate (ABR), variable bit rate (VBR), constant bit rate (CBR), and unspecified bit rate (UBR), the transmission port allocation may give ⅓ of the ports capacity to each of the data transport types. The output data rate may further be calculated based on a bandwidth scaling factor such that bandwidth allocated to connections of the at least one data transport data type is controlled.

The process then proceeds to step 72 where a difference term is derived from the input data rate and the output data rate 8. The difference term may be, but is not required to be, limited when difference term is unfavorable with respect to a difference boundary, as shown at step 72-1. For example, the difference term may be limited to 0.10 such that, per ER calculation, the ER value may only change a maximum of +/−10%.

The process then proceeds to step 74 where a current generic explicit rate is generated based on a previous generic explicit rate and the difference term. An option process for generating the current generic explicit rate is further described with reference to steps 74-1 through 74-3. At step 74-1 a current queue value is derived based on the difference term and a previous queue value, wherein the current queue value is equal to or greater than zero. For example $Q_{k+1}1= Q_k^*(1+\Delta Q)$, where $Q_{k+1}$ is the current queue value, $Q_k$ is the previous queue value and $\Delta Q$ is the difference term. The process then proceeds to step 74-2 where an error term is derived from the current queue value and a target queue value. For example, $E=(T-Q_k)$, where E represents the error term and T represents the target queue value. The process then proceeds to step 74-3 where the current generic explicit rate is generated based on the previous generic explicit rate, the difference term, and the error term. For example, $OWB_k=OWB_{k-1}*\varsigma$, where $\varsigma=1+k_1(T-Q)-K_2(\Delta Q)$.

The process then proceeds to step 76 where at least one specific explicit rate for a corresponding one of a plurality of connections of the at least one data transport type is generated from the current generic explicit rate and a corresponding weighting factor.

The preceding discussion has presented a method and apparatus for flow control of a transmission port. Flow control of the transmission port is made more efficient by calculating an ER value at an output port, and using non-linear terms to achieve a steady state more quickly and with improved stability. Such an ER calculation may be made when information regarding the queue (Q) is unknown. For instance, when the Q size is unknown, when the Q is empty, when the Q term is unavailable, or when the change is the Q is unknown. As one of average skill in the art would appreciate, the present invention is applicable to a wide variety of data flow control processes. As such, other embodiments may be developed in accordance with the teachings of the present invention.

What is claimed is:

1. A method for providing data flow control of a transmission port, the method comprises the steps of:
   a) obtaining, for the transmission port over time, input data rate of at least one data transport type and output data rate of the at least one data transport type;
   b) deriving a difference term from the input data rate and the output data rate; and
   c) generating a current generic explicit rate based on a previous generic explicit rate and the difference term.

2. The method of claim 1 further comprises calculating the output data rate based on transmission port allocation of a plurality of data transport types, wherein the plurality of data transport types includes the at least one data transport type.

3. The method of claim 2 further comprises calculating the output data rate based on a bandwidth scaling factor such that bandwidth allocated to connections of the at least one data transport data type is controlled.

4. The method of claim 2, wherein the plurality of data transport types includes at least some of: available bit rate (ABR), variable bit rate (VBR), constant bit rate (CBR), and unspecified bit rate (UBR).

5. The method of claim 1 further comprises generating at least one specific explicit ate for a corresponding one of a plurality of connections of the at least one data transport type from the current generic explicit rate and a corresponding weighting factor.

6. The method of claim 1 further comprises:
   deriving a current queue value based on the difference term and a previous queue value, wherein the current queue value is equal to or greater than zero; and
   deriving an error term from the current queue value and a target queue value.

7. The method of claim 6, wherein step (c) further comprises:
   generating the current generic explicit rate based on the previous generic explicit rate, the difference term, and the error term.

8. The method of claim 1 further comprises limiting the difference term when the difference term exceeds a difference boundary.

9. A telecommunication switch comprises:
   a first input port operably coupled to support a first plurality of connections, wherein each of the first plurality of connections is coupled to a corresponding one of a first plurality of sources;
   a second input port operably coupled to support a second plurality of connections, wherein each of the second plurality of connections is coupled to a corresponding one of a second plurality of sources;
   a first output port operably coupled to support at least some of the connections of the first and second plurality of connections, wherein each of the at least some of the connections of the first and second plurality of connections is coupled to a corresponding one of a first plurality of destinations;
   a second output port operably coupled to support remaining connections of the first and second plurality of connections, wherein each of the remaining connections of the first and second plurality of connections is coupled to a corresponding one of a second plurality of destinations;
   a cross connector operably coupled to provide linking of the first and second plurality of connections to the first and second output ports; and
   an explicit rate engine operably coupled to the first and second output ports, wherein the explicit rate engine generates a plurality of specific explicit rates, wherein the explicit rate engine provides each of the plurality of specific explicit rates to a corresponding connection of the first and second plurality of connections within a backward resource management cell, and wherein the explicit rate engine includes:
   processing module; and
   memory operably coupled to the processing module, wherein the memory stores programming instructions that cause the processing module to (a) obtain, for the first and second input ports over time, input data rate of at least one data transport type and output data rate of the at least one data transport type; (b) derive a difference term from the input data rate and the output data rate; (c) generate a current generic explicit rate based on a previous generic explicit rate and the difference term; and (d) generate the plurality of specific explicit rates from the current generic explicit rate and a corresponding weighting factor.

10. The telecommunication switch of claim 9, wherein the memory further comprises operational instructions that cause the processing module to calculate the output data rate based on first and second input ports allocation of a plurality of data transport types, wherein the plurality of data transport types includes the at least one data transport type.

11. The telecommunication switch of claim 10, wherein the memory further comprises operational instructions that cause the processing module to calculate the output data rate based on a bandwidth scaling factor such that bandwidth allocated to connections of the at least one data transport data type is controlled.

12. The telecommunication switch of claim 9, wherein the memory further comprises operational instructions that cause the processing module to:
- derive a current queue value based on the difference term and a previous queue value, wherein the current queue value is equal to or greater than zero; and
- derive an error term from the current queue value and a target queue value.

13. The telecommunication switch of claim 12, wherein the memory further comprises operational instructions that cause the processing module to:
- generate the current generic explicit rate based on the previous generic explicit rate, the difference term, and the error term.

14. The telecommunication switch of claim 9, wherein the memory further comprises operational instructions that cause the processing module to limit the difference term when difference term is unfavorable with respect to a difference boundary.

15. An explicit rate engine comprises:
- processing module; and
- memory operably coupled to the processing module, wherein the memory stores programming instructions that cause the processing module to (a) obtain, for the first and second input ports over time, input data rate of at least one data transport type and output data rate of the at least one data transport type; (b) derive a difference term from the input data rate and the output data rate; (c) generate a current generic explicit rate based on a previous generic explicit rate and the difference term; and (d) generate the plurality of specific explicit rates from the current generic explicit rate and a corresponding weighting factor.

16. The explicit rate engine of claim 15, wherein the memory further comprises programming instructions that cause the processing module to calculate the output data rate based on first and second input ports allocation of a plurality of data transport types, wherein the plurality of data transport types includes the at least one data transport type.

17. The explicit rate engine of claim 16, wherein the memory further comprises programming instructions that cause the processing module to calculate the output data rate based on a bandwidth scaling factor such that bandwidth allocated to connections of the at least one data transport data type is controlled.

18. The explicit rate engine of claim 15, wherein the memory further comprises programming instructions that cause the processing module to:
- derive a current queue value based on the difference term and a previous queue value, wherein the current queue value is equal to or greater than zero; and
- derive an error term from the current queue value and a target queue value.

19. The explicit rate engine of claim 18, wherein the memory further comprises programming instructions that cause the processing module to:
- generate the current generic explicit rate based on the previous generic explicit rate, the difference term, and the error term.

20. The explicit rate engine of claim 15, wherein the memory further comprises programming instructions that cause the processing module to limit the difference term when difference term is unfavorable with respect to a difference boundary.

* * * * *